United States Patent [19]

Bernstein et al.

[11] Patent Number: 4,956,866
[45] Date of Patent: Sep. 11, 1990

[54] EMERGENCY SIGNAL WARNING SYSTEM

[75] Inventors: Bernard Bernstein, Phoenix, Ariz.; Guy L. Sohie, Austin, Tex.

[73] Assignee: Sy/Lert System Ltd., Phoenix, Ariz.

[21] Appl. No.: 374,450

[22] Filed: Jun. 30, 1989

[51] Int. Cl.$^5$ .................... G10L 7/08; G06G 1/095
[52] U.S. Cl. ........................ 381/43; 340/907
[58] Field of Search .................... 381/41–46, 381/110, 56; 340/901–906, 724.09, 907; 367/197–199; 369/724.01, 724.08

[56] References Cited

U.S. PATENT DOCUMENTS

| | | | |
|---|---|---|---|
| 2,545,218 | 3/1951 | Weber et al. | 177/352 |
| 3,014,199 | 12/1961 | Dill et al. | 340/34 |
| 3,233,217 | 2/1966 | Bost, Jr. | 340/33 |
| 3,735,342 | 5/1973 | Helliker et al. | 340/34 |
| 3,859,623 | 1/1975 | Koehler | 340/34 |
| 3,873,963 | 3/1975 | Neal et al. | 340/34 |
| 4,158,190 | 6/1979 | Stefanov | 340/34 |
| 4,209,769 | 6/1980 | Chronerberry | 340/34 |
| 4,380,004 | 4/1983 | Coats et al. | 340/34 |
| 4,573,187 | 2/1986 | Bui et al. | 381/43 |
| 4,625,206 | 11/1986 | Jensen | 340/902 |
| 4,759,069 | 7/1988 | Bernstein et al. | 381/56 |
| 4,783,803 | 11/1988 | Baker et al. | 381/43 |
| 4,785,474 | 11/1988 | Bernstein et al. | 381/56 |
| 4,806,931 | 2/1989 | Nelson | 381/56 |
| 4,829,578 | 5/1989 | Roberts | 381/46 |

FOREIGN PATENT DOCUMENTS 0179348 9/1985 Japan .
0219521 11/1985 Japan .

Primary Examiner—Dale M. Shaw
Assistant Examiner—John A. Merecki
Attorney, Agent, or Firm—LaValle D. Ptak

[57] ABSTRACT

A siren detection system, particularly suited for installation in an automobile for providing a warning to the driver when an emergency vehicle is operating a siren in the vicinity of the automobile, utilizes a microphone on the automobile to detect the siren signals. An analog-to-digital conversion of the signal obtained from the microphone is supplied to a digital signal processor which is programmed to provide high selectivity of the frequency of the input signals, with improved noise rejection and improved frequency determination.

15 Claims, 2 Drawing Sheets

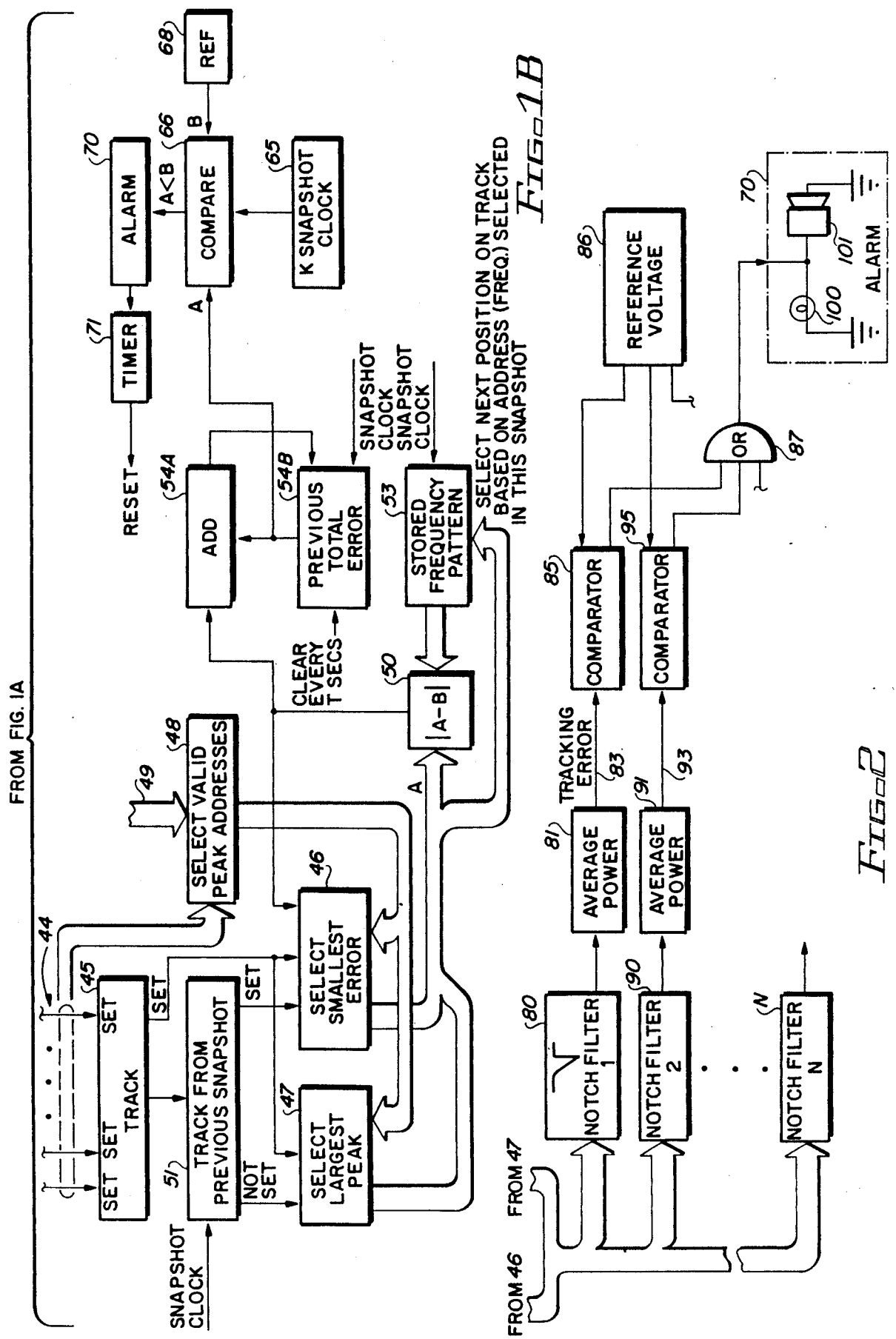

EMERGENCY SIGNAL WARNING SYSTEM

BACKGROUND

Systems for detecting the sirens of emergency vehicles to provide a warning signal to the driver of an automobile have been known for many years. In the most simple form, such systems employ a band-pass filter or comparable device to respond to signals only within the frequency range of emergency vehicle sirens. Whenever such a signal is received in such a system, an alarm or warning device, in the form of a light or sound, is operated within the automobile. Such simple systems, however, have not been satisfactory since they are easily triggered by "noise" signals having nothing to do with emergency vehicle sirens. After activation of the alarm device by a number of "false alarms", a driver of an automobile equipped with such a system has a tendency to ignore the alarm when it sounds, thereby defeating the purpose of the system.

In the past, particularly before the advent of automobile air conditioning, automobiles frequently were operated with the windows open. In addition, the radios or sound systems in older automobiles are not of the "sound-surround" type; so that drivers of such automobiles generally were able to hear the siren of an approaching emergency vehicle while it still was some distance away.

In contrast to older automobiles, modern automobiles are extremely well sound proofed. Most such automobiles are operated with the windows closed practically all of the time. In the winter, the heater system of the automobile is used to keep the interior warm; and in the summer, an air conditioning system is used to cool the interior of the vehicle. Whether the heater system is being operated or the air conditioning system is being operated, an accompanying fan, with a relatively high degree of noise, is operating within the vehicle. In addition, most modern automobiles have radios or extensive sound entertainment systems with multiple speakers located at various points in the automobile in them. If the radio or sound system is being played with the window closed, and if at the same time either the heater system or the air conditioner is operating, it is difficult, if not impossible, for the occupants of the automobile to hear the siren of an approaching emergency vehicle until such an emergency vehicle is extremely close to the automobile. In fact, in many cases the driver and other occupants of an automobile do not hear the siren of an approaching emergency vehicle until such emergency vehicle is only a few feet away. Consequently, a high potential for an accident between the automobile and the emergency vehicle exists.

Emergency vehicle sirens typically operate in one or the other of three different operating modes, such as "yelp", "wail", or "hi-low". Whichever operating mode is used, the typical frequency range for the sirens in any of the modes extends from a lower frequency of approximately 500 Hz to a upper frequency of approximately 1600 Hz. For a "yelp" siren, the frequency variation is accomplished by a sweep upwardly from the low end of this frequency range to the upper end, with a more sudden drop back down again to the low frequency, for each single cycle of the "yelp" mode. This cycle then is repeated at a rate of 1 to 4 cycles per second. The exact frequency range covered and the cycle repetition rate varies somewhat for different models and types of siren, but the variation for both the frequency range and the repetition rate is within the range mentioned here.

For a "wail", the frequency range again is from a low frequency of approximately of 500 Hz, changing substantially in accordance with a sine-wave pattern, to an upper frequency (approximately 1600 Hz) and back down again on a continuous basis. The repetition rate or frequency of this sine-wave variation generally is at a lower repetition frequency than for the "yelp" operating mode.

"Hi-low" sirens usually employ two frequencies, with a sudden transition between the low frequency to the high frequency and back again at a rate of repetition similar to the repetition rate used in a "wail" siren.

To minimize false operation of an alarm, more sophisticated tone detector systems than the simple band-pass detection systems mentioned above are necessary. Seven (7) patents which are directed to types of pattern recognition for emergency vehicle sirens are the Helliker U.S. Pat. No. 3,735,342; Koehler U.S. Pat. No. 3,859,623; Stefanov U.S. Pat. No. 4,158,190; Jensen U.S. Pat. No. 4,625,206; Nelson U.S. Pat. No. 4,806,931; and two Patents to Bernstein et al. No. 4,785,474 and No. 4,759,069. All of these patents are directed to systems which recognize specific frequencies within the "siren" band of signals typically produced by emergency vehicles. In addition, all of these systems attempt to minimize false triggering of the alarm circuit by noise signals.

The system disclosed in the Helliker Patent provides pattern recognition by cascading the detected outputs of tuned filters with one another, so that an output signal is obtained only when the tuned filters all produce an output within a pre-established interval. The system continuously is reset (thus establishing the pre-established time interval); so that even if noise signals should activate one or more of the tuned filter circuits, no output is obtained. It also is necessary for all of the signals to occur in the proper sequence or no output is obtained. If, as a result of interference, an improperly operating siren, or an aberration in the siren frequency (such as caused by sound bouncing off of the walls of buildings or the like), the system of Helliker may be reset without activating the alarm, even in the presence of a siren signal which it is desired to detect. In addition, the Helliker system requires multiple tuned filters which are bulky and expensive.

The Jensen and Nelson Patents are not directed to alarms for use within an automobile, but the systems of these patents are concerned with the actuation of a traffic signal light control to cause the signal light to be operated in response to the detected siren sound pattern. Typically, the signal lights are caused to be red in one direction and green in another, as determined by the direction of the source of the siren sound pattern detected.

In the Jensen Patent, a plurality of tuned narrow band band-pass filters must be operated in the proper sequence to provide the frequency detection representative of a siren. Detection of one frequency enables the circuit to detect signals of the next higher (or lower) frequency, and so on. Out-of-sequence tones disable the circuit and reset it. In addition, the Jensen system includes provisions for determining the direction from which the emergency vehicle siren in approaching.

The Nelson Patent also is directed to a directional control system for operating the traffic signal lights at an intersection to cause red lights to appear in all directions except the one from which the emergency vehicle is approaching. Nelson, however, employs a microprocessor programmed with specific pattern recognition algorithms to continuously sample the received input signals to produce an alarm output if a match in the pattern of the input signal with one of the algorithms occurs. This system consequently eliminates the necessity for a large number of cumbersome and expensive tuned filters for its operation. The algorithms which are programmed into the microprocessor of Jensen each begin with a "start" frequency range and continuously cycle to determine whether an input frequency fits within the start frequency range. The recycling time is relatively short, but it is necessary for the received siren pattern detected by the system to be at the "start" or beginning of a siren cycle to insure the proper sequential operation of the algorithm for determining whether a valid "siren" signal is present.

The system disclosed in the Koehler Patent is designed to detect a pair of spaced frequencies which are within the siren frequency range. Koehler relies upon a "wailing" siren signal which has a repetition frequency at a relatively low rate. The detected signals produce an output of the repetition frequency which then is used to trigger the alarm. Noise signals occuring at repetition rates other than the siren signal repetition frequency, even if they do include signals of the same frequencies as the two siren signal frequencies, will not have the required repetition rate. Consequently, such noise signals will not permit triggering of the alarm system. In an extremely noisy, heavy traffic environment, such as typically found in large cities, it may be possible to false trigger the Koehler system.

In addition, the system of Koehler assumes a relatively uniform repetition frequency of the siren. Modern emergency vehicles, however, do not always operate the siren in the same mode. When such a vehicle approaches a traffic intersection, the driver frequently switches the siren from a "wailing" operating mode to what is known as the "yelp" operating mode. The repetition frequency of a siren operating in the "yelp" mode is higher than the frequency of a "wailing" mode. Thus, if the Koehler system is adjusted to detect a "wailing" siren, it may not detect a "yelp" siren and vice-versa.

A different approach for tracking a "wailing" siren frequency is disclosed in the Stefanov Patent. In Stefanov, however, the "wailing" frequency rate is tracked by a voltage tunable filter. If a siren is present, this "wailing" signal occurs at a fixed rate, which generally is uniform for most emergency vehicle sirens. The outputs for the voltage tuneable filter controlled by the "wailing" signal then are passed through low and high frequency filters to control the operation of the alarm circuit. The voltage tuneable filter provides an output corresponding to the dominant frequency; and this output is converted to a voltage by means of a frequency-to-voltage convertor which then is fed back to the band-pass filter to shift the center frequency of that filter. Thus, the dominant frequency signal is tracked by the system. When this signal results from a "wailing" siren, the fed-back voltage from the convertor constitutes a slowly and continuously varying AC signal corresponding to the pitch variation of the siren. This signal is detected by a low-pass filter and a differentiating circuit to operate an alarm within an automobile. When the dominant frequency results from noise or steady-state sounds or varies at a rate other than the slowly varying AC signal, a different or random shifting of the center frequency of the band-pass filter occurs. Additional circuitry responsive to such random signal shifts then generates an inhibiting signal to prevent spurious operation of the alarm within the automobile. To be effective, this system requires several cycles of operation in order to produce an alarm output. Frequently, the number of cycles required may be such that the alarm within the automobile will not be triggered until the emergency vehicle is dangerously close. As with prior art patents which require a sequential or cascading detection of signals within the siren frequency range for proper operation, it is possible for Stefanov to fail to trigger an alarm even though an emergency vehicle siren is present, if that siren somehow is not operating properly in the expected manner, or if sound reflections from nearby buildings and the like distort some aspects of the siren signal.

The two Bernstein et al. Patents are directed to siren detection systems which are particularly suited for installation in an automobile and which have a high degree of selectivity and noise rejection capabilities. The Bernstein et al. systems employ a plurality of narrow band band-pass filters, the outputs of which are applied in parallel to an averaging circuit which produces a single output corresponding to the central one of any of the filters providing an output during a pre-established time interval. This output then is compared with the previous output (which indicated the previously selected band-pass frequency) to operate an up/down counter. Whenever successive counts of a pre-established number in the same direction occur, the output of the counter enables an alarm to indicate the presence of a siren operated by an emergency vehicle in the vicinity of the automobile. Since random noise signals do not produce the necessary successive output counts from the counter, the system starts a new count when successive outputs of the averaging circuit do not occur in the pre-established pattern. The Bernstein et al. systems operate to provide a relatively rapid determination of the presence or absence of a siren signal based on a relatively short time frame, but the systems of these patents require several band-pass filters which, as mentioned previously, results in additional expense and bulk for the system.

It is desirable to provide a siren detection alarm for use within an automobile which overcomes the disadvantages of the prior art, which is not subject to "false" alarms, and which rapidly and accurately provides an alarm indication without requiring a multiplicity of band-pass filters.

SUMMARY OF THE INVENTION

It is an object of this invention to provide an improved sound pattern detection system.

It is another object of this invention to provide an improved siren detection system.

It is an additional object of this invention to provide an improved siren detection system for use in automobiles.

It is a further object of this invention to provide an improved siren detection system having the capability of rapidly and quickly identifying the presence of a siren operated in the vicinity of an automobile.

In accordance with a preferred embodiment of the invention, a system is provided for detecting the presence of sound signals varying in frequency in a predetermined manner over a predetermined frequency range. The system includes a source of input signals which are representative of the sound signals to be detected. A convertor is coupled with the source of input signals to provide a digital signal output in the form of signal bits or words representative of the input signals. A digital signal processor is coupled with the convertor to continuously process and store the output of the convertor into groups of predetermined numbers of bits. As each successive "N" (where N is a positive integer) group of such predetermined numbers of bits is stored and processed, an output representative of a characteristic of the signal at the source of the input signal corresponding to each of the "N" groups of bits is produced. When a predetermined pattern of variations of successive outputs occur in a predetermined time interval, an alarm signal is produced by the system.

BRIEF DESCRIPTION OF THE DRAWINGS

FIGS. 1A and 1B together comprise a block diagram of a preferred embodiment of the invention; and FIG. 2 is a block diagram of an alternative embodiment to be substituted for a portion of the embodiment shown in FIGS. 1A and 1B.

DETAILED DESCRIPTION

Figure 1A:
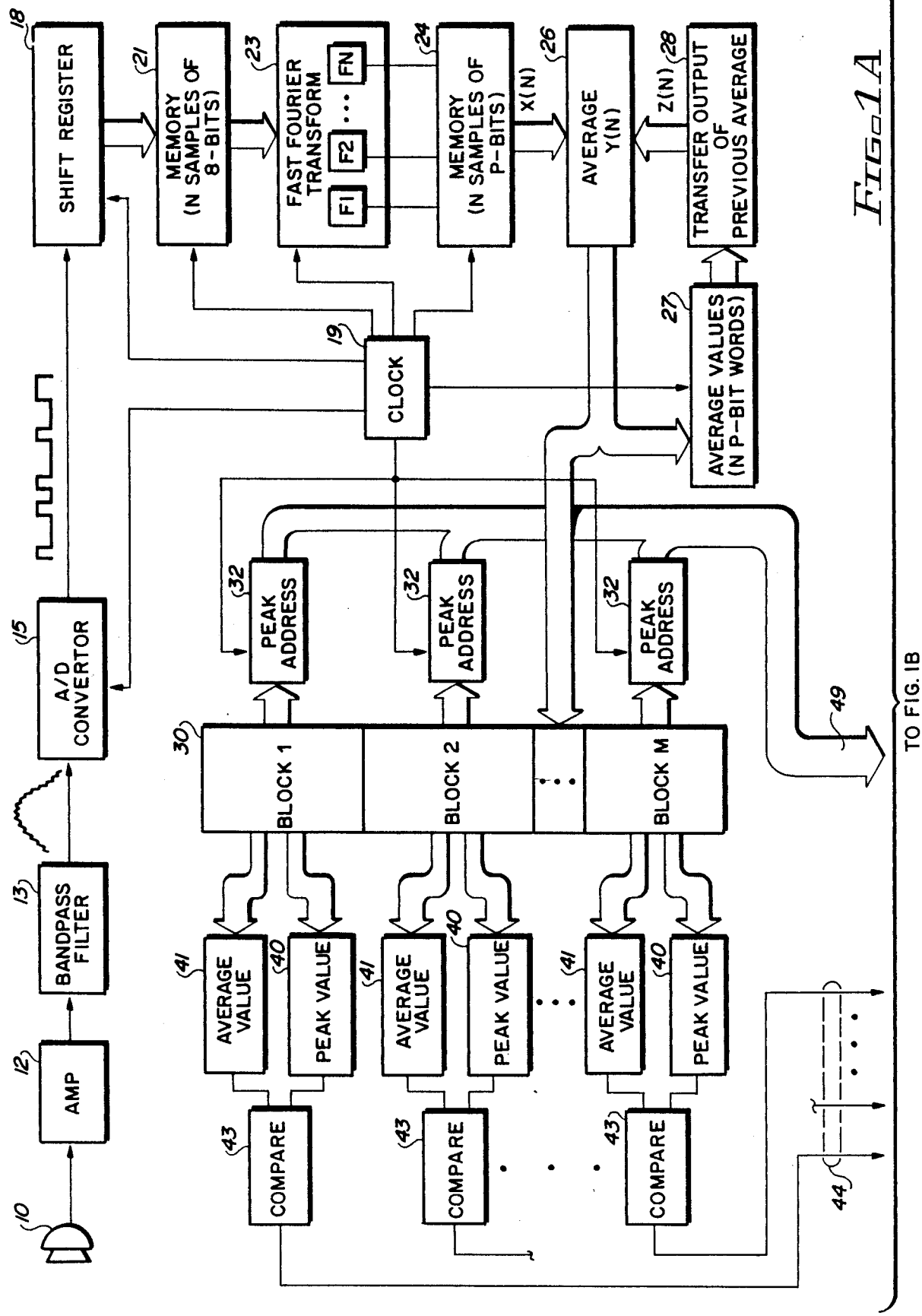

Reference now should be made to the drawings for a description of the preferred embodiments of the invention. FIGS. 1A and 1B together comprise a block diagram of a circuit operating in accordance with a preferred embodiment of the invention. The system illustrated in FIGS. 1A and 1B is to be mounted in an automobile. Whenever any emergency vehicle siren is sounded near the automobile, the system provides the driver of the automobile with sufficient advance warning of the presence of the emergency vehicle to permit the driver to take the necessary proper action.

The system illustrated includes a microphone 10, which is mounted at a position on the automobile to pick up or detect sounds outside of the interior. Typical mounting places are on the roof, behind the front grill or some other suitable location. Audio signals impinging on the microphone 10 are converted to analog electrical signals which are amplified by an amplifier system 12. The amplifier 12 preferably has an automatic gain control feature. The output of the amplifier 12 then is supplied to a band-pass filter, having a lower cutoff frequency of approximately 500 Hz and having an upper cutoff frequency of approximately 1600 Hz; so that signals outside this frequency band are eliminated. This improves the noise rejection characteristics of the system and reduces artifacts of "mirror" or "aliased" frequencies introduced by the discrete sampling.

Sirens used by emergency vehicles, such as police cars, ambulances, and fire trucks, produce signals, the pitch or frequency of which and the intensity of which varies with time within this frequency range. The frequency range of between 500 Hz and 1600 Hz also takes into account the shifts which occur through Doppler effects. The repetition rate of the siren signals varies, as described previously, for the different types of signals, such as "yelp", "wail", and "hi-low".

The signals from the output of the band-pass filter 13 then are applied to an analog-to-digital convertor circuit 15 which, in the example shown, provides a serial data output stream. For the example under consideration, the digital data from the output of the convertor 15 is a simple 8-bit Codec (a sequence of eight-bit words transmitted serially). If desired, the convertor 15 could provide a parallel output for subsequent processing.

The remainder of the circuit shown in FIGS. 1A and 1B ideally is provided by a suitably programmed, high performance, single chip digital signal processor such as the Motorola DSP 56000 or DSP 56001. Other suitable programmed digital signal processors may be used, but applicant has found that the DSP 56000/1 effectively operates to provide accurate detection of siren signals coupled with accurate rejection of other signals and background noise. The circuitry shown in FIGS. 1A and 1B illustrates the manner in which the internally programmed algorithms and DSP 56000/1 hardware are configured to provide the desired pattern recognition mechanism or operation.

Essentially, the data received from the output of the analog-to-digital convertor 15 is converted from serial to parallel form by serially supplying it to an 8-bit shift register 18, the output of which is transferred out in parallel following the receipt of each different 8-bit word in the continuous data stream from the analog-to-digital convertor 15. If the convertor 15 provided a parallel output, the shift register 18 would not be necessary. Since the input to the convertor 15 is obtained from the output of the band-pass filter 13, it is readily apparent that the only signals which are converted by the convertor circuit 15 are signals in the relatively narrow frequency range of interest. Thus, the output of the analog-to-digital convertor 15 is representative of the time varying amplitude of signals within that signal range only.

An internal clock 19 in the DSP 56000 provides timing signals for all of the different circuit blocks which are illustrated in FIGS. 1A and 1B. Although several outputs of the clock 19 are illustrated as connected to the clock inputs of various ones of the blocks, other clock outputs also are provided to synchronize and coordinate the operation of all of the circuit elements with one another. This is in accordance with standard microprocessor circuit operations, so that further explanation of the interrelationship of the clock 19 with the other circuit components is not considered necessary here.

Each 8-bit word transfered into the shift register 18 represents the value of the sampled microphone signal at a sampling instant. The sampling rate is at least twice that of highest frequency rate of the highest frequency (1600 Hz) of the input signals being sampled. A typical sampling rate is 4000 Hz.

Each time 8-bits are collected by the shift register 18, an interrupt is generated in the digital signal processor (DSP). This interrupt then transfers the contents of the shift register 18 in parallel to consecutive locations in a memory 21. As illustrated, the memory 21 is shown as having a capacity of "N" samples of 8-bits (where "N" is a positive integer, generally greater than 1). This is a continuous process, and one of these "N" 8-bit words is placed into the memory 21 every "T" seconds, where "T" is the sampling time of the system.

When "N" groups of these 8-bit words, hereinafter called "samples", are collected and placed into the memory 21, the DSP automatically places the next "N" samples in a different memory block 21 and causes a Fast Fourier Transform algorithm 23 to process the first block of "N" samples from the memory 21. It should be noted that digital processing of the "N" samples stored in the memory 21 is effected by the FFT circuit 23 during the time that the next block of "N" samples is being stored in a different memory block, such as the memory block 21, or in a different block of "N" samples in the same memory 21, shown in FIG. 1A. No block of "N" samples, however, is overwritten by a new block until after the block has been processed by the FFT circuit 23. It has been found that each of the "N" blocks typically may constitute 64 or 128 words of information.

The data collection of the data available on the output of the analog-to-digital convertor 15 and the processing of the "N" groups of samples by the FFT circuit 23 occur continuously after the first group of "N" samples has been collected in the memory 21. Each time a new group of "N" samples is collected by the memory 21, that group of samples is processed by the FFT circuit 23 to provide an output. The output from the FFT circuit is equivalent to the output magnitude of "N" band-pass filters, each with a different center frequency. Instead of physical filters, however, the "N" filter output magnitudes are represented by values (or "words") of "P" bits in the internal memory of the system. This is illustrated in the memory circuit 24 of FIG. 1A which stores "N" samples of "P" bits obtained from the output of the FFT circuit 23. In the case of the Motorola DSP 56000, the number of bits "P" equals 24. Thus, every time sample at the input of the system is used to determine the output magnitude of each of the equivalent filters ("N" filters) in the FFT algorithm 23.

In a theoretically ideal operating situation, if a siren is present during such a "snap shot" of "N" samples, only one memory value or input to the memory 24 from the output of the FFT will contain a significant value. This output corresponds to the frequency of the siren during the "snap shot" or sample of the output of the convertor 15. In actual operation, however, because of traffic and other noise, because of imperfect sirens, and because of imperfect frequencies discrimination of the FFT, other outputs of the FFT 23 supplied to the memory 24 will contain significant values. Consequently, the output of the memory 24 is supplied to an averaging circuit 26, which functions to estimate the correct frequency corresponding to the siren detected by the microphone 10.

The averaging circuit 26 provides a constant average of all of the results of the outputs of the FFT circuit 23 supplied through the memory 24. This is achieved by combining the snap shot of "N" samples from the memory 24 for each "snap shot" with an averaged output obtained by combining with it the output of the previous snap shots. The following averaging formula is used in the digital signal processor to do this:

$$y(n) = ax(n) + bz(n)$$

In the above formula, y(n) denotes the outputs of the averaging process (as n goes from 1 to N), x(n) denotes the outputs of the FFT obtained from the memory 24 of the present snap shot (as n goes from 1 to N), and z(n) denotes the previous outputs of the averaging (again as n goes from 1 to N). When all y(n) are computed, all z(n) are replaced by the y(n) values ready for the next snap shot. This is illustrated by the loop connected to the output of the averaging circuit 26 which provides each output of the average circuit 26 to the circuit 27, which constitutes the averaged values, z(n), of the averaging. This value then is transfered through the circuit 28 to be combined in the circuit 26 at the time of the next snap shot of the information in the memory 24. This is a constant loop operation which continuously occurs in synchronization with the operation of the FFT circuit 23.

Since the siren frequencies are known to fall in a specific frequency band (500 Hz to 1600 Hz in the present example), all values of average frequencies outside this band can be ignored by the system. Since the outputs of the FFT circuit 23 correspond to frequencies in the range from 0 (DC) to 1/T (the frequency at which the microphone signal is sampled at the convertor 15), a number of outputs of the FFT circuit 23 may be ignored or deleted. This operation is not separately shown in FIG. 1A, and theoretically can be done either before or after the operation of the averaging circuit 26. Ideally, however, it is done prior to averaging, since only the frequency band of interest requires averaging. Thus, it is more time efficient to eliminate these out-of-band outputs prior to applying the output of the memory 24 to the averaging circuit.

After the frequencies (of interest) from the FFT circuit 23 are kept and averaged by the memory 24 and averaging circuit 26, the actual siren frequency must be determined. Most noise exhibits a "flat" spectrum, that is, noise affects each of the frequency outputs of the FFT circuit 23 approximately equally. In contrast, a siren frequency within a given snap shot only affects a narrow frequency band, namely one or a small number of FFT outputs concentrated around a specific memory location in the memory circuit 24. Thus, the frequency of the siren is provide by a "peak" location corresponding to the specific FFT output in that particular snapshot.

This location of a "peak", corresponding to a siren signal contrasted with a noise signal, is located by supplying the output of the averaging circuit 26 to a block storage circuit 30 having storage locations corresponding to "M" blocks. The number of blocks "M" is less than "N", and a snapshot of "N" samples is subdivided into "M" blocks. Within each block a peak (maximum) is found.

If the peak which is selected by the peak address circuit 32 is some given percentage above the average x %, it is determined as possibly constituting a portion of a siren signal, and a flag called "track" is set. This is obtained by comparing the peak value in each block through a peak value output 40 with the average value in a comparator 43. This occurs for the outputs of each of the "M" blocks. The outputs of the comparators 43 are either a binary "0" or a binary "1". A "1" is a signal for setting the flag "track". These signals are applied in parallel from all of the blocks to the flag "track" 45 (essentially an OR gate). The outputs 44 from the comparators 43 also are supplied to a circuit 48 to select the peak addresses from the circuits 32 which correspond to the comparators 43 providing a "1" output.

The flag track 45 is set if any one of the outputs of the comparators 43 indicates that at least one peak is sufficiently larger than the average. The old value of "flag" (from the previous snapshot) is shifted from track 45 to a circuit 51 designated "track from previous snapshot". This is accomplished under control of a snapshot clock signal which occurs for each of the snapshots taken of the data as it is processed by the system. If the present track value from 45 is not set, nothing happens and the system proceeds to collect the next snapshot. If, however, track 45 was set from a previous snapshot, this is stored in the circuit 51 and one or the other of two situations exist. Either the previous track was "set" or the previous track was "not set". This results in one or the other of two enabling signals from the circuit 51, indicated as "set" and "not set".

If the track 45 is set from a previous snap shot, the peak is chosen with the minimum pattern error. On the other hand, if "track" was not set from a previous snap shot, each of the likely "peaks" are equally probable to correspond to a siren frequency. In such a case, it is not correct to choose the peak with the greatest amplitude, since a siren is not always stronger than the traffic noise. This is particularly true for a siren on an emergency vehicle which is some distance from the vehicle in which the system of FIGS. 1A and 1B is installed. A characteristic of traffic noise, however, is utilized to provide a degree of selectivity in selection of the proper "peak" in such a situation.

Traffic noise typically is dominant in the lower range of the frequencies of interest. As a result, the highest "peak" frequency is retained arbitrarily. The likelihood is greater that this is a correct siren signal than if one of the lower frequency "peaks" were retained.

The output from the valid peak address selection circuit 48 is supplied to two different control circuits. The first of these is identified as the select smallest error peak circuit 46 and the other is identified as the select largest peak circuit 47. These circuits 46 and 47 are triggered by a "set" output from the track 45. The circuit 46 is enabled by the "set" output from the circuit 51 and the circuit 47 is enabled by the "not set" output of the circuit 51. Consequently, one or the other of these two circuits 46 and 47 is selected. The selected one corresponds to the most probable location of the siren frequency or peak in the snapshot being evaluated at this time.

Whichever one of the circuits 46 or 47 is selected, the output peak frequency which appears is provided to a comparator circuit 50 which compares the signal with a stored frequency pattern profile. This is obtained from a stored frequency pattern circuit 53 which includes look-up tables for the various siren patterns which may be detected by the system. More than one pattern may be detected, since simultaneous comparison with various look-up tables can be effected by the system. The look-up tables in the stored frequency pattern circuit 53 comprise profiles which constitute ideal tracks of the various siren frequencies. This profile comparison is effected approximately every two seconds for wail, ¼ second for yelp, and one second for hi-low in an actual working embodiment of the system.

The comparison effected by the circuit 50 is to compare the present frequency obtained from the outputs of the selected one of the circuits 46 or 47, with the stored track predicted siren frequency in the snapshot; and a tracking error magnitude is computed, which constitutes the absolute value of the difference between the output of the circuit 46 or 47, and the stored frequency pattern 53. This results in the production of a tracking error signal provided on an output from the comparison circuit 50 and supplied to a tracking error generating circuit 54.

The circuit 54 operates to add the tracking error for the snapshot currently producing the output from the comparison circuit 50 to the total tracking error of the previous snapshots, to produce a signal representative of the total tracking error.

If the current snapshot is the first snapshot to result in a probable siren condition, typified by a peak selection from either of the circuits 46 or 47, the address or frequency of the previous step in the stored pattern look-up table 53 is used to align the output from the circuit 46 or 47 with the frequency track of the stored pattern 53. It is possible, for example, that the first siren signal is picked up or detected in the middle of a sweep, rather than at the beginning, whereas the stored pattern reference track in the look-up table 53 starts in the beginning of the sweep. The aligning process is accomplished by finding that position in the reference track which has a frequency as close as possible to the presently measured frequency. This is accomplished by the error comparator circuit 54 utilized to compute the tracking error.

The circuit 54 is comprised of two different sections, 54A and 54B. The output of the comparator 50, constituting the present comparison of the stored frequency pattern and the output of one or the other of the circuits 46 and 47, is supplied to one input of an adder section 54A. The other input to the section 54A is obtained from section 54B, which stores the previous total "tracking error" accumulated from the output of the section 54A. This is illustrated by showing the output of section 54A supplied to the input of the section 54B. The addition is effected each snapshot by a snapshot clock input to the section 54B. Every "T" seconds, the total sampling interval, the section 54B is cleared or reset to an initial value.

The total accumulated error which is provided by the output of the section 54B also is supplied to one input of a comparator circuit 66. The other input of the comparator 66 is obtained from a reference 68, which provides a threshold signal indicative of an alarm level to the comparator 66. Every "K" snapshots, an enable signal is supplied from a snapshot clock circuit 65 to the comparator 66 to permit the comparison to be made. If there is no siren present, a relatively high tracking error voltage is indicated by the summation of the error from the section 54B. This then causes the input to the comparator 66 from the section 54B to be greater than the threshold value from the reference 68 at the time the snapshot clock 65 enables the comparator, and no alarm signal is provided.

On the other hand, if a valid siren signal is being tracked by the circuit, the sum of the output samples provided by the tracking error accumulator circuit comprising the sections 54A and 54B is a relatively low value. At the time the output from the snapshot clock 65 then occurs, the accumulated tracking error is less than the threshold from the reference 68. This is an alarm condition, and an output from the comparator 66 is produced to trigger an output alarm 70; which produces a suitable alarm either in audible or visible form or both.

It should be noted that the tracking error accumulation in the section 54B is cleared every "T" seconds, the sampling interval, so that the operation of the circuit which has just been described is continuous. This total error output is checked every "K" snapshots by the circuit 65 on a continuous basis to provide a potential output signal to the alarm 70.

The alarm 70 also activates a timer 71, which maintains the alarm condition for a suitable time period, after which a signal is produced to reset the entire system to its initial starting condition.

FIG. 2 is directed to an alternative circuit for implementing the pattern recognition in place of the look-up tables in the stored frequency pattern generator 53 of the circuit of FIG. 1. In FIG. 2, the outputs from the circuits 46 and 47 are combined together and are supplied to one or more notch filters, three of which 80, 90, and "N" are indicated in FIG. 2. Each of the notch filters are tuned to the pass-band of the frequency at which the siren frequency pattern varies in time. As mentioned previously, this is a relatively slow frequency, for example, for a "yelp", it is 1 to 4 cycles per second, and for a "wail" it is on the order of once every three or four seconds. Each notch filter receives an input once per snapshot.

As is well known, for signals at frequencies other than the frequency of the pass-band of a notch filter, the output of the notch filter is a relatively high constant value. If the frequency of the signal supplied to the inputs of the notch filters 80 or 90 is one emitted by a siren and varying at the frequency to which the particular notch filter 80 or 90 is tuned, the output of the notch filter drops to a low voltage which is significantly lower than the output at all other times. Consequently, the average notch filter output power may be considered to constitute a measure of the "tracking error" of the system.

In the circuit of FIG. 2 the output of the respective notch filters 80 and 90 (and any other notch filters which may be used for detecting other siren patterns) are supplied through average power circuits 81 and 91, respectively. The circuits 81 and 91 constitute simple integrating circuits or other suitable circuitry. The output of the circuit 81 constitutes the tracking error for the notch filter 80, and the output of the circuit 91 constitutes the tracking error for the notch filter 90. These outputs are supplied, respectively, to a pair of comparators 85 and 95 on inputs 83 and 93, respectively. The other inputs to the comparators are obtained from a reference source 86, which establishes the threshold level to determine the presence or absence of an emergency vehicle siren signal. If either of the inputs 83 or 93 exceeds the threshold, an output is obtained from the respective comparator 85 and 95. This output is supplied through an ORgate 87 to provide the alarm signal 70 which operates in the same manner described previously. This sets a visible alarm 100 or audible alarm 101 in the vehicle in which the system is installed.

It should be noted that the notch filter technique for computing the tracking error is more simple than the stored frequency pattern look-up tables 53 of the embodiment shown in FIG. 1B. The utilization of notch filters, however, only is capable of recognizing siren sounds or other signals of a periodic character and cannot be used to recognize other patterns such as car horns, whistles, and the like. The embodiment shown in FIG. 1B may recognize any desired pattern and is not as limited in application as the alternative embodiment of FIG. 2. For periodically varying siren signals, whether they are "yelp", "wail", or "hi-low", either embodiment, that of FIGS. 1B or FIG. 2, may be used to provide the final output from the system to trigger the alarm.

The foregoing description of the preferred embodiments of the invention is to be considered illustrative of the invention and not as limiting. Various changes and modifications will occur to those skilled in the art without departing from the true scope of the invention. The invention may be implemented in individual hard-wired circuits, or it may be implemented in a programmed data signal processor, preprogrammed with the necessary algorithms and sequence operations to effect the functional operations which have been described in conjunction with the preferred embodiment. Other changes and modifications may be made without departing from the true scope of the invention as defined in the appended claims.

We claim:

1. A system for detecting the presence of emergency siren sound signals varying in frequency in a predetermined manner over a predetermined frequency range, said system including in combination:
   a source of input signals representative of said emergency siren sound signals;
   convertor means coupled with said source of input signals for providing a digital signal output in the form of signal bits representative of said input signals;
   digital signal processor means coupled with said convertor means for continuously processing and storing the output of said convertor means into groups of predetermined numbers of bits of said digital signal output;
   control means responsive to the storage of successive "N" (where "N" is a positive integer) groups of said predetermined numbers of bits for processing each of said "N" groups of bits and providing an output signal representative of the frequency of said signals at the source of input signals for each of said "N" groups of bits;
   averaging means for averaging the output signals from said control means to provide a first comparison output signal representative of the average value of the output signals from said control means;
   means coupled with said control means for determining the peak values of the output signals from said control means to produce a second comparison output signal;
   first comparison means with first and second inputs coupled to continuously receive said first and second comparison output signals to produce a continuous sequence of flag output signals whenever an emergency siren sound signal is present;
   reference signal pattern means; and
   second comparison means coupled with the output of said first comparison means and said reference signal pattern means for continuously comparing successive flag output signals from said first comparison means with said reference signal pattern means for providing an alarm output signal in response to a predetermined comparison correlation.

2. The combination according to claim 1 wherein said convertor means comprises an analog-to-digital convertor.

3. The combination according to claim 2 wherein said source of input signals includes means for restricting said input signals to a predetermined frequency range corresponding to the frequency of emergency sirens.

4. The combination according to claim 3 wherein the output of said convertor means comprises a digital signal output; said digital signal processor means stores successive groups of said predetermined number of bits from said convertor means; and said control means responds to each "N" groups of bits for providing said output signals representative of the frequency of the signal at the source of said input signals.

5. The combination according to claim 4 wherein said control means comprises means for performing a Fast Fourier Transform on said groups of bits stored by said digital signal processor means.

6. The combination according to claim 5 wherein said digital signal processor means, said control means and said means responsive to said predetermined pattern of variations, all are included as part of a single chip digital signal processor.

7. The combination according to claim 1 wherein said means for producing an alarm signal comprises at least one notch filter means, with the output of said notch filter means producing said alarm output signal.

8. The combination according to claim 7 further including a plurality of notch filter means, each having a passband centered at a different frequency corresponding to different repetition frequencies of different sound signals, the outputs of said plurality of notch filter means connected together in parallel for producing said alarm output signal.

9. The combination according to claim 8 further including means responsive to said alarm output signal for resetting said system to an initial operating condition after a predetermined period of time.

10. The combination according to claim 1 wherein said source of input signals includes means for restricting said input signals to a predetermined frequency range corresponding to the frequency of emergency sirens.

11. The combination according to claim 1 wherein said control means comprises means for performing a Fast Fourier Transform on said groups of bits stored by said digital signal processor means.

12. The combination according to claim 1 wherein the output of said convertor means comprises a digital signal output; said digital signal processor means stores successive groups of said predetermined number of bits from said convertor means; and said control means responds to each "N" groups of bits for providing said output signals representative of the frequency of the signal at the source of said input signals.

13. The combination according to claim 12 wherein said means for producing an alarm signal comprises at least one notch filter means, with the output of said notch filter means producing said alarm output signal.

14. The combination according to claim 13 further including a plurality of notch filter means, each having a passband centered at a different frequency corresponding to different repetition frequencies of different sound signals, the outputs of said plurality of notch filter means connected together in parallel for producing said alarm output signal.

15. The combination according to claim 1 further including means responsive to said alarm output signal for resetting said system to an initial operating condition after a predetermined period of time.

* * * * *